3,336,273
HYDROGENATED COPOLYMERS OF CONJUGATED DIOLEFINS, SULFUR DIOXIDE AND ETHYLENICALLY UNSATURATED COMPOUNDS
Edward A. Youngman, Lafayette, Ronald S. Bauer, Orinda, and Howard V. Holler and Hans E. Lunk, Oakland, Calif., assignors to Shell Oil Company, New York, N.Y., a corporation of Delaware
No Drawing. Filed Feb. 11, 1965, Ser. No. 432,011
16 Claims. (Cl. 260—79.3)

This invention relates to novel polysulfones and more particularly to high molecular weight and highly stable polysulfones.

There has been in the past some interest in polysulfones in the preparation of fibers and other commercially useful products. However, these polysulfones have failed to be of commercial value, undoubtedly because of their high costs and/or poor characteristics and properties. The polysulfones have generally been prepared by oxidizing polythioethers or by copolymerizing unsaturated hydrocarbons and sulfur dioxide.

Polysulfone preparation by the former route requires production of polythioethers by reacting dimercaptides with non-conjugated diolefin or with dihalides. However, these reactions require the use of high purity monomers which at best produces polythioethers of relatively low molecular weights. Additionally, complete oxidation of the latter to the corresponding polysulfones has not been attained due to solubility and degradation problems. Thus, polysulfones prepared by this route have poor stability and color characteristics which are apparently due to the presence of intermediate polysulfoxides caused by incomplete oxidation and are thereby quite unsuitable for the manufacture of textiles and the like.

The other method most utilized for preparing polysulfones is that of coplymerizing an unsaturated hydrocarbon monomer and sulfur dioxide. A variety of monoolefinic hydrocarbons have been used such as ethylene, propylene, 1- and 2-butene, isobutylene, pentenes, cyclohexene, etc. The resulting polysulfone materials are alternating 1:1 copolymers having a repeating structural unit

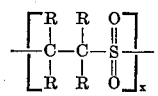

where R may be hydrogen or a hydrocarbyl group and $x$ is an average number which may be quite large.

Although some of these monoolefin-$SO_2$ copolymeric sulfones are of high molecular weight, the repeating structural unit has inherent deficiencies. Such copolymers are severely and rapidly degraded by even the mildest bases such as soaps and organic commercial detergents. They also undergo rapid thermal degradation at moderate temperatures, thereby reverting to the starting hydrocarbon monomers and sulfur dioxide. In addition, with the exception of the ethylene-$SO_2$ copolymer, these materials have poor crystallinity or they are amorphous. Where high molecular weight, stable and highly crystalline products are desired, such as in the preparation of molded materials, films, fibers and the like, these above-mentioned polysulfones are obviously inferior and unsatisfactory.

On the other hand, products obtained by copolymerizing butadiene and $SO_2$ have high molecular weights, high melting points and very high crystallinity while certain other diolefins yield copolymers which are poorly crystalline or amorphous and have low melting points. The diene polysulfones, however, also possess properties which make them generally unsuitable for many desired uses. In order to produce useful products from resinous materials of this type, it is often necessary to heat them to a plastic or liquid state or to prepare solutions of them, such as in the preparation of moldings or castings or in the melt or solution spinning of fibers, and the like. However, the unsaturated diene polysulfones are thermally unstable. When heated to their flow temperatures they rapidly decompose to their monomeric materials, e.g., butadiene and sulfur dioxide. In addition, the diene polysulfones are severely degraded by bases. As a result of this instability of the unsaturated polysulfones of this type known heretofore, no practical fabrication methods are known and they have no practical utility.

It is an object of this invention to provide novel stable polysulfones having high molecular weight. These and other objects will become apparent and better understood from the following disclosure.

The novel polysulfones of this invention are hydrogenated copolymers of a conjugated diolefin, sulfur dioxide and at least one copolymerizable ethylenically unsaturated compound. These polymers by virtue of their high molecular weights and stability at their melting point or flow temperatures may be utilized in the preparation of molded products, films, fibers and other plastic applications.

The conjugated diolefins used to prepare the terpolymers are preferably those having from 4 to about 8 carbon atoms. Examples of these monomers include 1,3-butadiene, 1,3-pentadiene (piperylene), 2-methyl-1,3-butadiene (isoprene), 2,3-dimethylbutadiene, 1,3-hexadiene, 2,4-hexadiene, 1,3-cyclohexadiene, 1,3- and 2,4-heptadiene, 1,3-cyclooctadiene, etc.; 1,3-butadiene is preferred.

The monomers which may be used with said conjugated diolefins and sulfur dioxide to prepare the unsaturated polysulfones are ethylenically unsaturated compounds preferably containing from 2 to about 20 carbon atoms. Examples of the termonomers are non-aromatic monoolefinic hydrocarbons having from 3 to 8 carbon atoms such as propylene, butenes, isobutylene, pentenes, hexenes, cyclopentenes, norbornene, etc.; vinyl aromatics having from 8 to about 12 carbon atoms, such as styrene, vinyl naphthalene, etc.; functionally substituted olefins including halogen, cyano, amino, carboxyl or carboxylate ester and hydroxyl substituted olefins of from 2 to about 10 carbon atoms for example, vinyl chloride, vinylidene chloride, ethyl acrylate, acrylonitrile, allylamine, butenyl cyanide and allyl alcohol; conjugated diolefins of from 6 to 8 carbon atoms such as 2,3-dimethylbutadiene, 1,3-cyclohexadiene, 1,3- and 2,4-hexadiene, 1,3- and 2,4-heptadiene, 1,3-cyclooctadiene, and 1,3-and 2,4-octadiene; acetylenes such as acetylene vinyl acetylene, methyl vinylacetylene; and triolefins such as hexatriene.

In preparing the unsaturated polysulfones the polymerization reactions are catalyzed by a free radical initiator such as peroxides, azo-compounds or inorganic oxidizing agents which react with sulfur dioxide to yield a redox initiator system. Some specific examples include hydrogen peroxide, benzoyl peroxide, cumene hydroperoxide, di-tert-butylperoxide, ascaridole, tert-butyl hydroperoxide, acetyl peroxide, peracetic acid, silver nitrate, lithium nitrate, ammonium nitrate, as well as chlorates, perchlorates, nitrites, persulfates, trimethylamine oxide, dimethylaniline oxide, nitric oxide, nitrogen dioxide, perchloric, nitric and nitrous acids, diisobutylene ozonide, azobisisobutyronitrile, etc. These catalysts may be present in amounts between about 0.01% and 5% and preferably between about 0.01% and 1.0% by weight.

The particular method used in the polymerization reactions is not critical. The reaction may proceed, for example, by emulsion, suspension, or precipitation techniques or in solution.

By one method, the polymerization reaction may be carried out in solution wherein excess sulfur dioxide is the only solvent present, in which case the hydrocarbon monomers and initiator may simply be added to the sulfur dioxide or vice versa. Other solvents in which the monomeric materials are miscible, such as lower aliphatic alcohols, and aliphatic and aromatic hydrocarbons, may also be present. The unsaturated copolymeric polysulfones formed in the presence of these solvents will precipitate out upon formation and may thus be directly recovered.

Another method of carrying out the polymerization is in the presence of sulfolane or a phenolic compound in which the polysulfone reaction products are soluble or swollen. A special advantage of using these solvents in the polymerization reaction is that the reaction solution containing the unsaturated polysulfone may be directly hydrogenated without first isolating the polysulfone, as will be more fully set forth below. This method of preparing the polysulfones of this invention is not only advantageous from a practical standpoint but is unexpected since phenolic compounds are notorious for their chain transfer properties which causes them to severely limit molecular weight and behave generally as polymerization retarders or inhibitors. However, when the reaction is accomplished in a phenolic compound such as m-cresol, phenol, p-chlorophenol, and the like, polymeric sulfones of high molecular weight are obtained.

To avoid the necessity of using large amounts of sulfur dioxide the emulsion technique may be used. In that technique, the polymerization takes place generally in an aqueous medium with the aid of emulsifying agents.

The emulsifying agent used is not critical and may be anionic, cationic or non-ionic. However, since the aqueous phase is present usually in greater quantity than the oil phase, the use of anionic agents resulting in an oil-in-water type emulsion may be preferred. Suitable emulsifying agents which may be used include such materials as the fatty acids and their soaps including substituted derivatives of the fatty acids and rosin acids, sulfuric esters including salts of sulfated fatty oils and alcohols, alkane sulfonates, alkarylsulfonates, mahogany and petroleum sulfonates, as well as phosphorus-containing emulsifying agents. Some specific examples include the alkali metal salts of $C_{12}$ to $C_{18}$ straight chain carboxylic acids, e.g., sodium stearate, sodium oleate, and mixtures thereof as acids obtained from tallow, coconut oil, palm oil, etc., tall oil acid soaps, sodium lauryl sulfate, sodium dodecylbenzene sulfonate, sodium di(2-ethylhexyl)-orthophosphate and the like. Any amount of emulsifying or suspending agent may be used which will provide at least a relatively stable emulsion or suspension of the polymerization ingredients. Generally, from about 0.5 to about 10% by weight of emulsifying agent is sufficient.

The order in which the ingredients are added or mixed is not critical and generally any convenient method of preparing the reaction mixture may be utilized. It may be found convenient, for example, to add sulfur dioxide in liquid form at temperatures below $-10°$ C. Where such technique is used, it is preferable to have an aqueous phase which freezes at a lower temperature than $-10°$ C. wherein the presence of an alcohol or glycols with the water is satisfactory. Thus, the liquid sulfur dioxide may be added to the liquid aqueous phase conveniently without boiling. To this mixture are added the hydrocarbon monomers. The polymerization reaction temperature may be between about $-60°$ C. and about $120°$ C.

The molecular weight of the unhydrogenated polysulfones may be controlled over a wide range by adjusting the polymerization conditions. The solubility of the unsaturated polysulfones depends on the types of monomers used and the respective amounts of each contained in the polymer. For example, when the preferred butadiene is one of the monomers, where the other termonomer comprises more than about 20% by weight of the total hydrocarbon monomer content, the resulting polymers are soluble in sulfolane and fluoroalcohols and phenolic compounds at temperatures of about 100° C. It is also found that once these terpolymers are placed in a phenolic or fluoroalcohol solvent they remain in solution even on cooling and at the temperatures of hydrogenation and lower. The unsaturated polysulfones of this invention are clear to white apaque and are stable up to temperatures of about 150° C.

The relative proportions of monomers used in preparing the polymers are not critical. It has been found that the polysulfones prepared as set forth above have an essentially perfectly alternating $+A+SO_2+$ structure, where A represents one molecule of hydrocarbon monomer, regardless of the ratio of hydrocarbon; sulfur dioxide present in the reaction mixture. The only apparent exception to this is where vinyl chloride or a vinyl aromatic termonomer such as styrene is utilized, in which case A represents a hydrocarbyl radical containing both vinyl chloride or styrene or other vinyl aromatic and the diolefin molecules which have copolymerized. Thus, a very large excess of sulfur dioxide may generally be employed or alternatively an excess of hydrocarbon monomer may be used since, with the exceptions noted, the copolymerization with sulfur dioxide is much faster than the hydrocarbon homopolymerization. The most desirable ratio will vary from case to case and can be determined readily by those skilled in the art.

The relative proportions of the diolefins and the other hydrocarbon comonomers are determined by the concentration of the respective hydrocarbons desired in the product and by the pertinent relative reactivities. Since these reactivities are comparable, any desired ratio of hydrocarbon monomers may be generally achieved. Preferred polymers are those wherein the weight ratio of diolefin: hydrocarbon comonomer is between about 20:1 and 1:20, and most preferably between about 20:1 and 1:4, respectively.

Prior to hydrogenation the unsaturated polysulfone is swollen or dissolved, suitable solvents being sulfolane, perfluoroalcohols such as perfluoroethanol, perfluoroisopropanol, etc., and especially the phenolic solvents such as phenol, p-chlorophenol, m-cresol, catechol, hydroquinone, pyrogallol, resorcinol, alpha-naphthol, etc. or mixtures thereof. Phenol, chlorophenols and the cresols are preferred.

The catalyst systems used in the hydrogenation reaction may be heterogeneous or homogeneous. Suitable heterogeneous catalysts include for example, platinum, rhodium, osmium, ruthenium, iridium, palladium, rhenium, nickel, copper, chromium, iron, cobalt, and compounds thereof such as oxides, sulfides, carbonyls, etc. These catalysts may be used alone or supported on a relatively inert material such as carbon, diatomaceous earth, alumina, silica, asbestos, pumice, etc. In order to achieve more efficient hydrogenation, it may be necessary to keep the heterogeneous catalysts dispersed throughout the polymer-containing solution such as by stirring the reaction mixture or agitating the reaction vessel. The amount of catalyst used may be between about 0.01 and 10% by weight and preferably between about 0.1 and 5% by weight based on the polymer present.

Homogeneous catalysts offer the advantage of being rapidly dispersed throughout the reaction medium and of being less readily poisoned, thus permitting the hydrogenation of polysulfones which are only swollen by the solvents. Such homogeneous catalysts include, among others, the rhodium systems disclosed in copending application Ser. No. 417,482, filed Dec. 10, 1964, the descriptions of which are incorporated herein by reference. Preferred catalysts of this type are the rhodium halide complexes such as trichlorotris(triphenylarsine)rhodium (III) and chlorotris(triphenylphosphine)rhodium (I). The amount of catalyst used is sufficient to provide from about 50 to 2000 p.p.m. and preferably between 100 and 1000 p.p.m. rhodium based on the polymer.

It is known that sulfur dioxide is poisonous to most catalysts, thereby rendering them ineffective for hydrogenation; the presence of free sulfur dioxide should be avoided at the time of hydrogenation. This is especially important when the hydrogenation directly follows polymerization by a method wherein an excess of sulfur dioxide is used or when polymerization is interrupted before complete conversion of the monomers.

The hydrogenation reaction temperature may be from about room temperature, i.e., 20° C. to about 200° C. with temperatures between about 80° and 130° C. being preferred. The rate of hydrogenation will depend upon the particular polymer being reduced, the solvent, temperature, catalyst, solution viscosity, pressure, etc. Although hydrogenation would proceed slowly at one atmosphere of hydrogen pressure, it is normally desirable to use a large excess of hydrogen and thus hydrogen pressures of up to 10,000 p.s.i. or higher may be used; the preferred range is between about 500 and 2000 p.s.i. The hydrogen may be bubbled through the polymer-containing solution or may be charged into a closed reaction vessel under pressure and then mixed with the solution by suitable means.

The hydrogenation process as disclosed herein only affects the ethylenically unsaturated linkages of the molecules and in no way reduces the stable sulfone portions of the polymer. Desirable product properties are attained by reducing the original ethylenic unsaturation by at least about 50% and up to 100%. The hydrogenated polysulfones of this invention are stable and have melting points and are soluble at temperatures well below those at which decomposition occurs. Although for some products complete hydrogenation is desirable, it is not necessary since any degree of hydrogenation above about 50% results in stable polymers. It has been found that melting points may be tailored within certain limitations by varying the degree of hydrogenation. The hydrogenated polymers have molecular weights between about 20,000 and 1,000,000 as characterized by intrinsic viscosity of from about 0.5 to 5.5 dl./g. determined in a 1:1 mixture of p-chlorophenol: m-cresol at 25° C.

The polysulfones of this invention are not highly crystalline, unlike the polysulfones disclosed in copending application Ser. No. 432,942, filed Feb. 11, 1965. However, in view of their high stability at their flow points they may be used in a number of plastic products.

The following examples are provided to illustrate the manner in which the invention is carried out. It is to be understood that the examples are given for the purpose of illustration only and the invention is not to be regarded as limited to any of the specific compounds or conditions recited therein. Unless otherwise indicated, parts and percentages disclosed in the examples are given by weight. "Percent by weight" is abbreviated "%w."

*Example I*

An unsaturated polysulfone was prepared by terpolymerizing butadiene, sulfur dioxide and styrene as follows: To an 8 oz. bottle was added 100 ml. water, 1 g. of sodium lauryl sulfate, 0.25 g. of $NH_4NO_3$ and 50 g. of liquid sulfur dioxide, the temperature of the mixture being maintained at about −11° C. Butadiene (15 g.) and styrene (15 g.) were then added to the bottle which was closed and the contents thoroughly stirred for about 3 hours at 30° C. The insoluble polysulfone product was present as a white slurry and was filtered and washed with methanol and dried. The unsaturated product contained 70% butadiene derived units and 30% styrene derived units in the hydrocarbon portion and 21.3%w sulfur.

Three grams of the terpolymer were then added to a 300 ml. autoclave containing 0.03 g. trichlorotris(diethylphenylarsine)rhodium (III), 0.24 g. triphenylphosphine and 30 ml. p-chlorophenol. The autoclave was sealed, purged with hydrogen, heated to about 120° C. and pressurized to 1400 p.s.i. with hydrogen. The contents of the reaction vessel were continually stirred while the hydrogenation reaction went to completion in about 14 hours. The terpolymeric sulfone was recovered from the reaction solution by pouring it into a Waring blender containing methanol, the mixture then being agitated until the polysulfone product had separated out. The polymer was then filtered and again mixed with methanol repeatedly until essentially all of the catalyst had been removed as evidenced by the absence of the characteristic yellow color from the product. Infrared analysis showed the polysulfone to be free of olefinic unsaturation. The product had a melting point of 223° C., a $T_{1/2}$ of 367° C. and was soluble in p-chlorophenol, m-cresol, and sulfolane at 100° C. ($T_{1/2}$ or half decomposition point is the temperature at which one half of the original polymer weight is lost at a heating rate of 2½° C. per minute under nitrogen.)

By comparison, the unhydrogenated terpolymer had a $T_{1/2}$ of 275° C. at which temperature no melting had occurred.

*Example II*

An unsaturated polysulfone was prepared by terpolymerizing butadiene, sulfur dioxide, and norbornene as follows: to an 8 oz. bottle was added 100 ml. water, 1 g. of sodium lauryl sulfate, 0.25 g. of $NH_4NO_3$ and 50 g. of liquid sulfur dioxide, the temperature of the mixture being maintained at about −11° C. Butadiene (15 g.) and norbornene (10 g.) were then added to the bottle which was closed and the contents thoroughly agitated for 16 hours at 10° C. The insoluble product was present as a white slurry and was filtered and washed with methanol and dried. The unsaturated product contained 40% butadiene and 60% norbornene in the hydrocarbon portion.

The terpolymer then was placed in the glass liner for a 300 ml. autoclave to which was added 0.03 g. of trichlorotris(diethylphenylarsine)rhodium (III), 0.24 g. triphenylphosphine and 30 ml. p-chlorophenol. The autoclave was sealed, purged with hydrogen, heated to 115° C. and pressurized to 1472 p.s.i. with hydrogen. The reaction mixture was continually agitated while the hydrogenation went to completion in 14 hours. The terpolymeric polysulfone was recovered from the reaction solution by pouring it into a Waring blender containing methanol. The polymer was then filtered and again mixed with methanol repeatedly until all of the catalyst had been removed as evidenced by the absence of the characteristic yellow color from the product. Infrared analysis showed the polysulfone to be essentially free of olefinic unsaturation. The product had a melting point of 281° C. and a $T_{1/2}$ of 404° C. By comparison, the unhydrogenated terpolymer had a $T_{1/2}$ of 270° C. at which point no melting had occurred.

*Example III*

In an 8 oz. bottle were placed 33.8 g. of commercial piperylene which contained about 12% cyclopentene, 32.4 g. of sulfur dioxide, 80 ml. of water, 20 ml. of methanol, 0.50 g. of ammonium nitrate, and 0.80 g. of sodium lauryl sulfate emulsifying agent. The bottle was shaken near room temperature for 17 hours to produce 59.4 g. of white powdery polymer which contained 23.5%w sulfur by analysis. Pyrolytic analysis of this polymer indicated 88%w piperylene and 12%w cyclopentene to have been incorporated in the hydrocarbon portion of the polymer.

Ten grams of the terpolymer dissolved in 200 ml. of m-cresol and 1.0 g. of triphenylphosphine and 0.10 g. of trichlorotris(diethylphenylarsine)rhodium (III) were added. The mixture was sealed in an autoclave under 1000 p.s.i.g. hydrogen and stirred for 20 hours at 100° C. The resulting mixture was flooded with methanol to obtain a polysulfone which was completely hydrogenated as shown by infrared analysis. This polymer could be pressed to clear colorless, fairly stiff films and had a melting point of 236° C. and a $T_{1/2}$ of 360° C. By comparison, the unhydrogenated terpolymer had a $T_{1/2}$ of 260° C.

*Example IV*

A reaction mixture consisting of cyclooctadiene-1,3 (20 g.), butadiene (5 g.), $SO_2$ (50 g.), water (100 g.), sodium lauryl sulfate (1 g.) and ammonium nitrate initiator (0.25 g.) was agitated for 16 hours at 30° C. The product, isolated as in the previous examples, contained 50% cyclooctadiene derived units and 50% butadiene derived units in the hydrocarbon portion. The sulfur analysis was 21.8%w.

A 2-gram sample of this polymer was placed in the glass liner for a 300 ml. autoclave to which was added 0.25 g. of 10% platinum on Celite and 20 ml. p-chlorophenol. The liner was placed in an autoclave. After purging the vessel with hydrogen the pressure was increased to 1135 p.s.i. and the reaction mixture heated to about 100° C. for 21 hours during which time the autoclave was constantly agitated.

The reaction product was filtered to remove the catalyst. The hydrogenated polysulfone was recovered by pouring the solution into methanol which was being agitated in a Waring blender. The polymer, which is insoluble in the alcohol, precipitated out of solution and was filtered off. The dried polysulfone, a white powder, was shown to be 80 to 90% saturated by infrared analysis and had a melting point of 242° C. and a $T_{1/2}$ of 330° C. It could be molded into stiff films without any signs of decomposition. The unhydrogenated terpolymer had a $T_{1/2}$ of 260° C. at which point no melting had occurred.

*Example V*

The hydrogenation of Example IV was repeated substituting 0.25 g. of 10% rhodium metal supported on carbon for the platinum catalyst. Hydrogenation was again 80–90% complete in 21 hours at about 100° C.

*Example VI*

A 2.0 g. sample of a 71% butadiene, 29% cyclooctadiene-$SO_2$ terpolymer was placed in the glass liner of a 300 ml. autoclave to which had been added 20 ml. p-chlorophenol and 0.3 g. Raney nickel. The bomb was purged with hydrogen and then pressured to 785 p.s.i. with hydrogen. While the reaction mixture was continuously agitated it was heated to about 150° C. for 21 hours.

The polymer was recovered by filtering off the nickel and then pouring the resulting polymer solution into methanol which was being agitated in a Waring blender. The resulting polymer was shown to be approximately 60% saturated and could be pressed into stiff clear, bubble-free films at 200° C. and 40,000 p.s.i.

*Example VII*

A hydrogenated terpolymer of butadiene, sulfur dioxide and cyclohexadiene was prepared by the same procedure as set forth in Example IV. The polymer contained 71% butadiene and 29% cyclohexadiene in the hydrocarbon portion and had a melting point of 280° C. and a $T_{1/2}$ of 360° C. The unhydrogenated terpolymer had a $T_{1/2}$ of 250° C. with no evidence of melting.

*Example VIII*

A total of 23.0 g. (0.36 mole) of $SO_2$ was bubbled into a mixture of 10.6 g. (0.20 mole) butadiene and 246.6 g. (1.02 mole) lauryl acrylate for over 15 minutes near 25° C. with stirring. Tert-butyl hydroperoxide (100 mg.) was then added at 10 and 25 mg. increments over 15 minutes with continued stirring. The resulting polymer was washed repeatedly with acetone and benzene and vacuum dried to 3.5 g. The resultant white powdery polymer contained 14.5%w sulfur and showed both lauryl acrylate- and butadiene-derived units to be present in the polymer by infrared analysis. The polymer was soluble in m-cresol at 100° C.

This terpolymer (2.6 g.) was hydrogenated using 200 ml. m-cresol, 0.10 g. trichlorotris(diethylphenylarsine) rhodium (III) and 1.0 g. triphenylphosphine stirred under 1000 p.s.i.g. of hydrogen overnight at 100° C. The product was precipitated from the solution with 5% aqueous HCl in methanol and washed thoroughly with MeOH. The resulting polymer was shown by infrared spectra to be saturated and it could be pressed into tough films.

Novel features of the methods disclosed herein for producing the claimed hydrogenated polysulfones are disclosed in greater detail and claimed in copending application Ser. No. 431,856, filed Feb. 11, 1965.

We claim as our invention:

1. A normally solid, hydrogenated copolymer of
   (1) sulfur dioxide,
   (2) a conjugated diolefinic monomer having from 4 to 8 carbon atoms per molecule, and
   (3) at least one olefinic comonomer which is an ethylenically unsaturated compound having from 2 to 20 carbon atoms per molecule, selected from the group consisting of
      (i) non-aromatic monoolefinic hydrocarbons,
      (ii) vinyl aromatics,
      (iii) conjugated diolefins of from 6 to 8 carbon atoms per molecule, different from said conjugated diolefin (2), and
      (iv) functionally substituted olefins containing as functional substituent halogen, cyano, amino, carboxyl, carboxylate ester or hydroxyl groups,
   said copolymer consisting essentially of recurring —$SO_2$— units alternating with recurring radicals derived from said organic monomers and having in the unhydrogenated state one ethylenically unsaturated site per diene unit, the weight ratio of radicals derived from one of said conjugated diolefinic monomers (2) to radicals derived from one of said olefinic comonomers (3) being between about 20:1 and 1:20, respectively, and the residual unsaturation being less than about 50%.

2. A hydrogenated copolymer according to claim 1 wherein said comonomer (3) is a non-aromatic monoolefinic hydrocarbon having from 3 to 8 carbon atoms per molecule.

3. A hydrogenated copolymer according to claim 1 wherein said comonomer (3) is a vinyl aromatic having from 8 to about 12 carbon atoms per molecule.

4. A hydrogenated copolymer according to claim 1 wherein said comonomer (3) is a conjugated diolefin having from 6 to 8 carbon atoms per molecule.

5. A hydrogenated copolymer according to claim 1 wherein said comonomer (3) is a functionally substituted olefin of from about 2 to about 10 carbon atoms per molecule, containing as functional substituent halogen, cyano, amino, carboxyl, carboxylate ester or hydroxyl groups.

6. A hydrogenated copolymer according to claim 1 wherein said conjugated diolefinic monomer (2) is butadiene.

7. A hydrogenated copolymer according to claim 1 having an intrinsic viscosity of at least about 0.5 dl./g., determined in a 1:1 mixture of m-cresol and p-chlorophenol at 25° C.

8. A hydrogenated copolymer according to claim 1 wherein said conjugated diolefinic monomer (2) is butadiene and said comonomer (3) is styrene.

9. A hydrogenated copolymer according to claim 1 wherein said ratio of radicals derived from one of said conjugated diolefinic monomers (2) to radicals derived from one of said olefinic comonomers (3) is between about 20:1 and 1:4, respectively.

10. A hydrogenated copolymer according to claim 9 wherein said comonomer (3) is a linear monoolefinic hydrocarbon having from 3 to 8 carbon atoms per molecule.

11. A hydrogenated copolymer according to claim 9 wherein said comonomer (3) is a vinyl aromatic having from 8 to about 12 carbon atoms per molecule.

12. A hydrogenated copolymer according to claim 9 wherein said comonomer (3) is a conjugated diolefin having from 6 to 8 carbon atoms per molecule.

13. A hydrogenated copolymer according to claim 9 wherein said comonomer (3) is a functionally substituted olefin of from about 2 to about 10 carbon atoms per molecule, containing as functional substituent halogen, cyano, amino, carboxyl, carboxylate ester or hydroxyl groups.

14. A hydrogenated copolymer according to claim 9 wherein said conjugated diolefinic monomer (2) is butadiene.

15. A hydrogenated copolymer according to claim 9 having an intrinsic viscosity of at least about 0.5 dl./g., determined in a 1:1 mixture of m-cresol and p-chlorophenol at 25° C.

16. A hydrogenated copolymer according to claim 9 wherein said conjugated diolefinic monomer (2) is butadiene and said comonomer (3) is styrene.

References Cited

UNITED STATES PATENTS

| | | | |
|---|---|---|---|
| 2,293,023 | 8/1942 | Hills et al. | 260—79.3 |
| 2,625,525 | 1/1953 | Lynch | 260—79.3 |
| 2,765,295 | 10/1956 | Crouch | 260—79.3 |

JOSEPH L. SCHOFER, *Primary Examiner.*

D. K. DENENBERG, *Assistant Examiner.*